United States Patent [19]
Morton

[11] Patent Number: 5,959,718
[45] Date of Patent: *Sep. 28, 1999

[54] ALIGNMENT AND PRINTING OF INTEGRAL IMAGES

[75] Inventor: Roger Roy Adams Morton, Penfield, N.Y.

[73] Assignee: Eastman Kodak Company, Rochester, N.Y.

[ * ] Notice: This patent is subject to a terminal disclaimer.

[21] Appl. No.: 08/828,572

[22] Filed: Mar. 31, 1997

[51] Int. Cl.⁶ .......................... G03B 35/00; G03B 35/14; G03B 27/32; G01B 11/00
[52] U.S. Cl. ...................... 355/22; 250/559.3; 347/248; 356/401; 359/463; 396/330; 430/946
[58] Field of Search ............................ 355/22; 347/248; 359/463; 348/59; 396/327, 330; 430/946; 250/548, 559.3; 356/399, 400, 401

[56] References Cited

U.S. PATENT DOCUMENTS

| | | |
|---|---|---|
| 4,588,899 | 5/1986 | Erhardt . |
| 4,903,069 | 2/1990 | Lam . |
| 5,036,356 | 7/1991 | Lo . |
| 5,279,912 | 1/1994 | Telfer et al. . |
| 5,349,419 | 9/1994 | Taguchi et al. . |
| 5,424,553 | 6/1995 | Morton . |
| 5,479,270 | 12/1995 | Taylor . |
| 5,492,578 | 2/1996 | Morton . |
| 5,539,487 | 7/1996 | Taguchi et al. ............................ 355/22 |
| 5,729,332 | 3/1998 | Fogel et al. ............................... 355/22 |
| 5,835,194 | 11/1998 | Morton ..................................... 355/22 |

*Primary Examiner*—Alan A. Mathews
*Attorney, Agent, or Firm*—Gordon M. Stewart; William F. Noval

[57] ABSTRACT

A method for forming an integral image on an image receiving medium which image is aligned or alignable with an integral lens sheet having a back side and a plurality of separate lens elements on a front side, and apparatus which can perform such a method. The method includes: directly sensing the location of each of a plurality of reference elements on the lens sheet which reference elements are separated in a same direction the lens elements are separated; and writing portions of the lenticular image on the image receiving medium each of which is associated with a corresponding lens element, in accordance with the sensed positions of the reference elements; wherein each of a plurality of image portions is written at a position which is a function of the directly sensed location of at least one selected reference element, the functions for at least some of the plurality of image portions being based on at least one different reference element.

33 Claims, 2 Drawing Sheets

ALIGNMENT AND PRINTING OF INTEGRAL IMAGES

FIELD OF THE INVENTION

The invention relates generally to the field of integral image elements which may display depth, motion or other images, and methods of making such elements.

BACKGROUND OF THE INVENTION

Integral image elements which use a lenticular lens sheet or a fly's eye lens sheet, and a three-dimensional integral image aligned with the sheet, so that a user can view the three-dimensional image without any special glasses or other equipment, are known. Such imaging elements and their construction, are described in "Three-Dimensional Imaging Techniques" by Takanori Okoshi, Academic Press, Inc., New York, 1976. Integral image elements having a lenticular lens sheet (that is, a sheet with a plurality of adjacent, parallel, elongated, and partially cylindrical lenses) are also described in the following Unites States patents. U.S. Pat. No. 5,391,254; U.S. Pat. No. 5,424,533; U.S. Pat. No. 5,241,608; U.S. Pat. No. 5,455,689; U.S. Pat. No. 5,276,478; U.S. Pat. No. 5,391,254; U.S. Pat. No. 5,424,533 and others; as well as allowed U.S. Pat. No. application Ser. No. 07/931,744 now abandoned. Integral image elements with lenticular lens sheets use interlaced vertical image slices which, in the case of a three-dimensional integral image, are aligned with the lenticules so that a three-dimensional image is viewable when the lenticules are vertically oriented with respect to a viewer's eyes. Similar integral image elements, such as described in U.S. Pat. No. 3,268,238 and U.S. Pat. No. 3,538,632, can be used to convey a number of individual two-dimensional scenes (such as unrelated scenes or a sequence of scenes depicting motion) rather than one or more three-dimensional images.

Integral image elements using reflective layers behind the integral image to enhance viewing of the integral image by reflected light, are also described in U.S. Pat. No. 3,751,258, U.S. Pat. No. 2,500,511, U.S. Pat. No. 2,039,648, U.S. Pat. No. 1,918,705 and GB 492,186.

In a typical method of assembling a lenticular type of integral image element, an original negative is exposed from stored digitized data of a composite lenticular image on a film writer. A suitable film writer is the Symbolic Sciences International Fire 1000 and the LVT Model 1620B, available from Light Valve Technology, a subsidiary of Eastman Kodak Company, Rochester, N.Y. A suitable negative exposure technique is disclosed in U.S. Pat. No. 5,276,478. After photographic processing, the negative is printed, typically by a projection enlarger, onto a suitable film- or paper-based photographic print stock. After processing, the lenticular composite print is coated with adhesive, aligned with a lenticular lens sheet, and pressed against the lens sheet to permanently adhere to it in proper registration with the printed lenticular composite image. However, it is also known to write the lenticular image directly onto a back side of a lenticular lens sheet which is coated with a suitable receiving layer, such as disclosed in U.S. Pat. No. 5,349,419 and U.S. Pat. No. 5,279,912. Furthermore, such "writing" of the lenticular image can be temporary, as in a display produced on a CRT or Liquid Crystal Display ("LCD") screen immediately adjacent the back side.

Since each of the lenses of a lenticular lens sheet is dedicated to a single image set of interleaved image lines, it is important that the lenticules be rotationally and translationally positioned with the image line sets, so that each set is parallel and aligned with a corresponding lenticule. Schemes for rotationally and translationally positioning a print with an overlay are disclosed in U.S. Pat. No. 5,479,270. However, by writing the image directly on the back side of the lenticular lens sheet, as disclosed in U.S. Pat. No. 5,349,419 and U.S. Pat. No. 5,279,912, an alignment step of the written image with the lenticular lens sheet is avoided.

While the width of each set of image lines may be less than or equal to the width of a lenticule, and each may be centered under its corresponding lenticule, these conditions are not essential. For example, U.S. Pat. No. 5,278,608 and U.S. Pat. No. 5,276,478 describe methods in which the image sets become increasingly spaced from the centers of their respective lenticules moving from the center to the edges of the integral image element. What is typically required is that all of the lines from only a single image can be clearly viewed from an intended (that is, preselected) viewing position in front of the lenticular lens sheet. For individual integral image elements or for short runs (that is, only a small number of copies) of integral image elements, this has been accomplished in the known art by first accurately measuring the pitch of the lenticular lens sheet to be used. The pitch, which provides the number of lens elements over a given distance, is a measure of the size of the lenticular lens elements. The spacing of the sets of image lines in the print of the integral composite image would then be selected by a suitable magnification of the original integral image (whether optically or mechanically during printing from a negative, or electronically before printing an integral image in a computer memory). Following selection of the magnification, the print would then be printed directly onto the back side of the lenticular lens sheet or onto a separate substrate (such as photographic film) with the resulting print then being aligned adjacent the back side of the lenticular lens sheet.

Increasingly, it is desired to provide more image lines (such as 10 or more) within each image line set so that more images can be seen through the lens element (such as more views for a look-around capability or more frames in a motion image sequence). This means for such "higher density lenticular images" that for a given lenticular lens sheet, each image line becomes narrower. Because of this, accurate alignment of the image line sets with respective elements becomes even more critical.

It would be desirable then, to provide a means by which relatively accurate alignment of image lines with corresponding lenticules can be obtained, even with very narrow image lines.

SUMMARY OF THE INVENTION

One of the features of the present invention is that it recognizes that for higher quality integral images in general (and lenticular images in particular) are required with a given integral lens sheet, integral lens sheet manufacturing imperfections can cause the image lines to no longer be sufficiently accurately aligned with respective lens elements for good image reproduction. For example, across a lenticular lens sheet minor variations in lens spacing (that is, the lens pitch) will cause misalignment between the lens sheet and the typical lenticular image printed based on the lens sheet manufacturer's stated lens pitch. Also, not all the lenticular lens elements may be exactly parallel with one another or the edge of the lens sheet. Some might run at a small angle to others or even be slightly curved rather than straight. This manufacturing imperfection may also result in slight misalignment which may be more noticeable with higher density integral images in particular.

There is provided then, in one aspect of the present invention, a method for forming an integral image on an image receiving medium which image is aligned or alignable with an integral lens sheet having a back side and a plurality of separate lens elements on a front side, the method comprising:

directly sensing the location of each of a plurality of reference elements on the lens sheet which reference elements are separated in a same direction the lens elements are separated; and writing portions of the lenticular image on the image receiving medium each of which is associated with a corresponding lens element, in accordance with the sensed positions of the reference elements.

By "separate" in the foregoing context is referenced the fact that the lens elements are individual distinct lens elements, it being understood though that they can be immediately adjacent one another without any intevening blank space (that is, where one ends, the other starts). Such is the case, for example, in a typical lenticular lens sheet.

In another aspect of the present invention, the method comprises:

directly sensing the location of each of a plurality of reference elements on the lens sheet which are spaced apart in a direction transverse to the lenticules;

writing portions of the lenticular image on the image receiving medium on the lens sheet, each of which is associated with a corresponding lenticule, in accordance with the sensed positions of the reference elements.

A still further aspect of the method of the present invention relates to a method for forming a lenticular image in alignment with a lenticular lens sheet having an image receiving medium and a plurality of lenticules, comprising:

directly sensing the location of each of a plurality of reference elements on the lens sheet which are spaced apart in a direction transverse to the lenticules;

forming a lens element map from the directly sensed locations as a signal;

writing portions of the lenticular image on the image receiving medium on the lens sheet, each of which is associated with a corresponding lenticule, in accordance with the sensed positions of the reference elements;

wherein prior to writing the lenticular image the lenticular image is modified with the lens element map so that the image portions are aligned with the lens elements.

The present invention further provides an apparatus for executing methods of the present invention using an image writer to write the image portions and means for executing the remaining steps of the methods.

The present invention then provides a means of obtaining relatively high alignment accuracy of image segments (particularly image lines in the case of lenticular imaging) with corresponding lens elements (particularly lenticules), even with very narrow image segments (particularly image lines). This can be obtained even if there are minor deviations of the actual position of a lens element from its expected position (such as the expected position of a lenticule based on lenticular pitch). Furthermore, the present invention allows for even minor deviations in lens element shape (particularly, lenticular direction in relation to other lenticules, that is lens element "skew", or in lenticular straightness), including correcting for curved lenticules by sensing the profile of the lenticular axis and controlling image writing to track along the profile.

BRIEF DESCRIPTION OF THE DRAWINGS

To facilitate understanding, identical reference numerals have been used, where possible, to designate identical elements that are common to the figures.

EMBODIMENTS OF THE INVENTION

Figure 2:
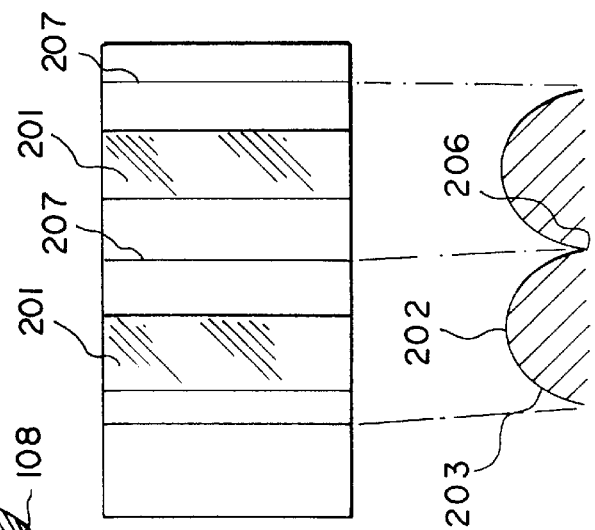
FIG. 2 is a view of a portion of a lenticular lens element as seen through a camera of the apparatus of FIG. 1 and also illustrates the portions of the lenticules being seen.

It will be appreciated in the present invention, that while the integral lens sheet could be a fly's eye lens sheet it is more preferably a lenticular lens sheet with lenticules on a front surface. Alternatively, the integral lens sheet could have regions of varying indices of refraction through its volume configured in such a way as to provide (in conjunction with the surfaces of the sheet, such as a curved external surface, flat external surface or some other shape) the same optical deflection of light rays as would be provided by a conventional fly's eye or lenticular lens sheet. Also, the back surface of the lens sheet may also be curved so as to either strengthen the lens effect or compensate for the curved focal plane which may be inherent in the lens construction. The lens may also be constructed from multiple elements, for example by laminating different materials with lens shapes. Consequently, the curvature on the back side may be of such a shape as to match the curvature of the focal plane of the lens. Further, by an "integral" composite image is referenced an image composed of segments (interlaced lines, in the case of a lenticular composite image) from at least one complete image (and often more than one image), which segments are aligned with respective individual lenses so that each of the one or more images is viewable when a user's eyes are at the correct angle relative to the imaging element. An integral lens web may be a continuous web of any integral element lens sheet type.

By "directly" sensing the position of a reference element is referenced actually identifying the position of the reference element of interest rather than calculating an assumed position based on, for example, an assumed relation with another feature on the lens sheet. Such reference elements may include the lenticules themselves, an edge of the lens sheet, some other profile which is extruded in the lens sheet, or reference marks for the entire lens sheet or a mark set which is positioned such that each mark can be used to identify variations of transverse lenticule positioning from the assumed location based on a fixed lenticular pitch, or portions of any of the foregoing. Sensing the location of indicia which are necessarily positioned with respective lenticules, is included within the concept of "directly" sensing the location. For example, determining the position of a reference mark which is positioned on each lenticule (such as a painted portion on the highest point at the end of every lenticule) is included within the concept of "directly" sensing the lenticule. This latter case can also include as sensing the location of a lens element by first altering the light absorption/reflection properties of a portion of a lens element to enhance sensor detection. One way of sensing is by illuminating at least a portion of each lens element to be sensed, and simultaneously observing the modulation of the illumination by such lens element. Alternatively, the area between lenses can be sensed or special profiles can be sensed. The reference elements used may be spaced apart in the same direction the lens elements are spaced apart (that is, transversely to the lenticules in the case of a lenticular lens sheet), and/or may be spaced along the length of one or more lenticules (such as different positions along the length of each lenticule). The first of these facilitates detection of lens pitch variations and will, for example, be spaced at least a distance equal to a lens element pitch with a total of one or more intervening lens elements (in the lens elements themselves are the reference elements, then the reference marks may be the peak of the lens elements and are therefore separated by a total of one intervening lens element). The second facilitates detection of lens skew or lenticular axis profile deviations. Two, three, four, or more reference elements can be used in each of the two different directions across a lens sheet.

Each of a plurality of image portions is preferably written at a position which is a function of the directly sensed location of at least one selected reference element. In this case, the functions for at least some of the plurality of image portions are based on at least one different reference element. The "selected" reference element may be any desired reference element such as the reference element closest (or even second or third closest, up to a distance depending on the characteristics of the non-uniformity of the lenticular lens sheet or vibrations or non-linearities introduced by the writing mechanism) to the lenticule corresponding to the image portion being written (and will typically be that lenticule itself where the reference elements are the lenticules themselves). Of course, more than one reference element can be used in the function. For example, where the reference elements are lines scored or formed adjacent every Nth lenticule during manufacture of the lenticular lens sheet, both the reference element closest to the lenticule corresponding to the image portion being written can be used along with the next closest reference element. Where the reference elements are the lenticules themselves, of course, only the one lenticule will normally be used for the function (that is, the function will simply be the location of that one lenticule). As to the function used, this will depend upon the type and location of reference element or elements chosen for use in the function. For example, if the reference elements are scored lines every Nth lenticule, the function should take into account how many lenticules the lenticule of interest is spaced from the reference element. Since the functions for at least some of the plurality of image portions are based on at least one different reference element, this means that all of the written image portions are not being located based on the same reference elements. This allows, for example, more accurate positioning of the image portions to take into account unexpected variations in lenticular pitch.

By a "lens map" is referenced data generated by sensing deviations or non-uniformities in the position of lenticular elements. This data be further improved by adding to it deviations in the path of the image writer (so that errors in both can be corrected together). By "modifying" the lenticular image with the lens map, is referenced using data from the lens map to ensure correct alignment between the image portions written by the image writer and the lenticules. This will allow the segments of an integral image (which are lines in the case of a lenticular image) to be more accurately aligned with respective lens elements. This modifying can take place, for example, in a suitable processor or can take place at the image writer itself. In the latter case, for example assuming a lenticular image, data representing the amplitude, intensity, transmission or reflection of a pixel of the image from a memory can be output to position a write head of the printer (such as a mirror on a laser printer) at a position in relation to a lens sheet which the lenticular image was built to assume (such as by a constant lenticular pitch) a corresponding lenticule would be. Data from the lens map can then be used to calculate (typically in the processor) intensity of a desired pixel at the actual position of that lens from the assumed position. This can be done by determining the pixel intensities adjacent to the assumed location and using these intensities to calculate by averaging or interpolation the pixel intensity at the actual map corrected location. Alternatively, the deviation can be output to re-position the write head at the actual location of the corresponding lenticule. The re-positioning could take place either by actual movement of the write head itself and/or by actual movement of the medium onto which the integral image is being written (which may or may not be attached to a back side of the lens sheet) or by modifying the timing of the signal generating the pixel amplitude data. It will be appreciated throughout this application, by a processor is referenced a suitable signal processor, such as a suitably programmed general purpose digital processor or hard wired equivalent circuitry. These techniques can also be used to correct for curvature of a lenticule axis.

As to the medium on which the integral image is written, this can simply be the back side of the integral lens sheet (which in a conventional integral lens sheet is opposite shaped lens surfaces, such as the semi-cylindrical shaped lens surfaces of a lenticular lens sheet). In this case then, the image receiving medium is already positioned at the back side of the lens sheet. The back side may or may not be coated with an image receiving medium, such as a photosensitive layer or layers (which may in particular be any known photographic layer or layers). It will be understood though, that if a transparent substrate bearing one or more photographic layers or other writable image bearing layers using thermal or inkjet electrophotographic methods (such as the transparent base of a conventional photographic film) is attached to a lenticular lens sheet by adhering the transparent substrate, the transparent substrate can then be considered to be part of a completed lenticular lens sheet (such that the photographic layers are still part of the back side of the completed lenticular lens sheet). Alternatively, the medium may be a separate substrate (such as a conventional photographic film). The integral image can then be written on the medium and the substrate bearing the written integral image then aligned behind the integral lens sheet and attached thereto. In this case then, an additional alignment step is required to bring the medium into position at the back side of the lens sheet with the integral image in correct alignment. It will also be appreciated that the methods of the present invention can be applied to integral images (and particularly lenticular images) which can exhibit a wide range of effects including motion, depth, flip, and other lenticular related effects.

In a variation of the present invention, the method and apparatus can be used simply to determine only curvature or non-straightness of lenticules. This can be done for one or more lenticules individually, or can be one for one or more lenticules with the remainder of the lenticules being assumed to follow the same shape (or their shapes can be estimated such as by interpolation from lenticules whose curvature or non-straightness were sensed). In this arrangement the location of at least three reference elements spaced in a direction along the lenticules, is directly sensed using sensing apparatus similar to those described below before the image portions are written.

Figure 1:
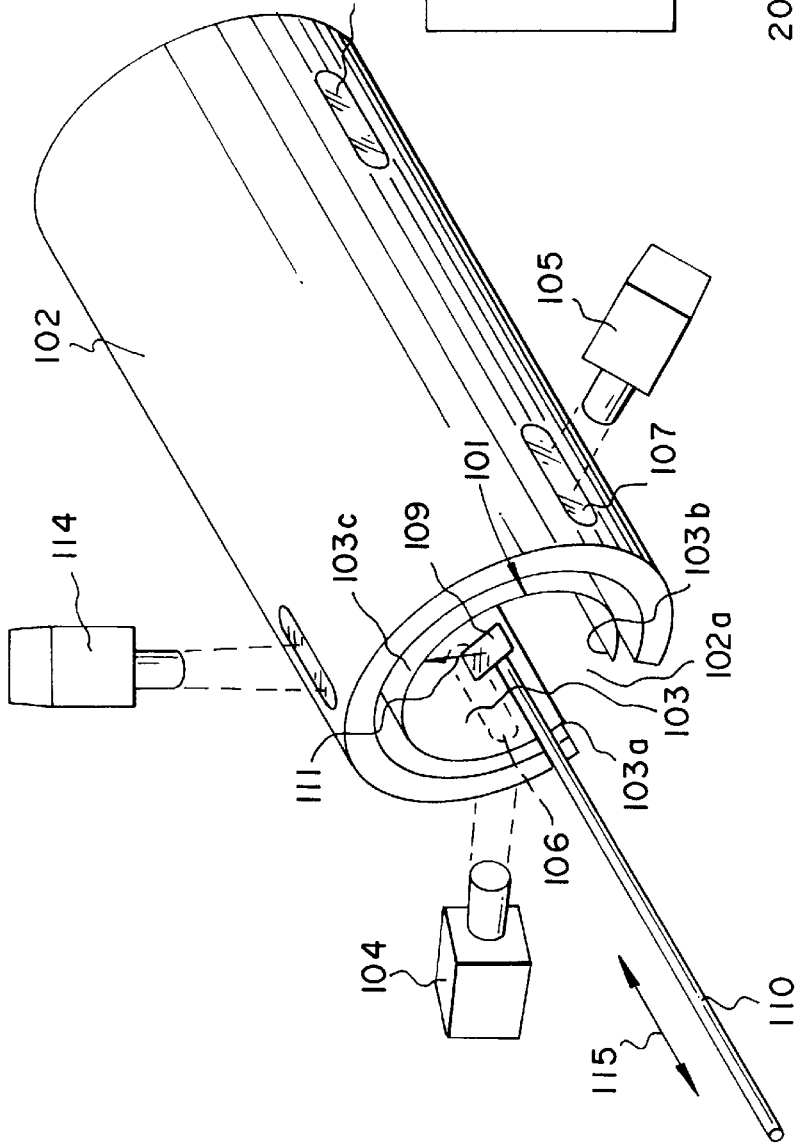
FIG. 1 is a perspective view of some of the components of an apparatus of the present invention, ready to execute a method of the present invention.
Figure 4:
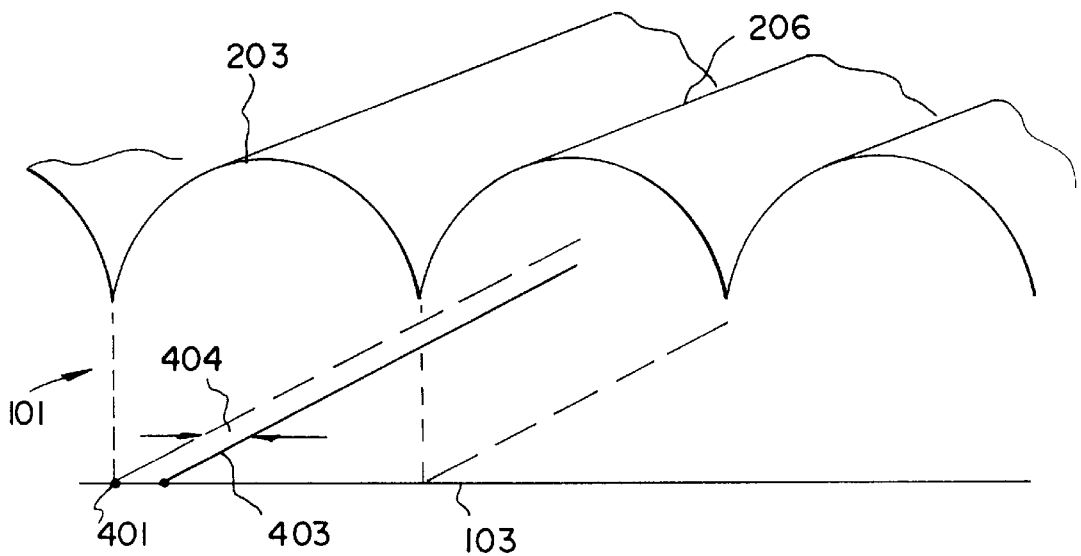
FIG. 4 is an end perspective view illustrating the positioning of an image line in relation to a lenticule.

Turning now to FIG. 1 the apparatus is an internal drum type scanner in which a lenticular lens sheet 101 is wrapped inside a cylindrical drum 102. Drum 102 includes an elongated opening 102a and is open at both ends. Lens sheet 101 includes a plurality of elongated, generally parallel, semi-cylindrical lens elements in the form of lenticules 203 as best seen in FIG. 4. Lens sheet 101 also has a back side 103 which includes an image forming medium 401 of multiple photosensitive layers such as may be found on a conventional full color photographic film. Lens sheet 101 is positioned with its back side 103, and hence image forming medium 401, facing toward the axis of drum 102, while lens elements 203 face in an outwardly direction with respect to drum 102. Each of the lens elements 203 extends in a circular path about the inside surface of drum 102 between opposite ends 103a and 103b of lens sheet 101. Cameras 104 and 105 are positioned to form images of the lenticular material through ports or windows 106 and 107 which are formed in the side of drum 102. Additional ports, for example port 108, can also be used by additional cameras (not shown). The cameras form images of the positions of the lenticular surface by using illumination techniques (not shown) so that the position of the lenticules can be accurately located. Optionally, the entire drum 102 may be made of a transparent material.

FIG. 2 shows for example a view as seen by one of the cameras, each of which acts as a sensor, with the surface of the lenticules 203 and the clefts 206 therebetween being particularly visible by the camera. The lower portion of FIG. 2 is a view across lenticules 203 as seen by one of the cameras 104, 105, 114, while the upper portion of FIG. 2 is the view actually seen by the camera. A cleft 206 between lenticules 203 appears as line 207 in the view seen by the camera. Band 201 corresponds to a top region 202 of a lenticule 203. Thus, the features of the lenticule forms an image within the camera and the position of the lines in the image can be used to directly define the location of the lenticules being viewed. If the position of the viewing camera is accurately known beforehand, the camera view provides a direct measure of the position of the lenticules relative to one another being viewed by that camera. With two cameras, such as camera 104 and 105, the position of the same lenticule 203 can be determined at different locations along each such lenticule 203 viewed by the camera.

However, with only two cameras such as cameras 104, 105, the cameras alone cannot tell if the lenticules seen by camera 104 and those seen by camera 105 are actually the same lenticules. In particular, while camera 104 is viewing a portion of at least one lenticule, there is no way to tell only from the views from cameras 104 and 105 which portion of a lenticule viewed in one camera, belongs to the same lenticule as a lenticule portion viewed in the other camera. This is because, as recognized in the present invention, it cannot be assumed that a given lenticule is accurately aligned or positioned to a degree such that it can be assumed that between ends 103a, 103b it does not also move to some degree in the axial direction of drum 102. However, provided an assumed position of the lenticule 203 of interest can be obtained, deviations of the position of the lenticule at any given position along its length, can be determined from the views if such deviations are less than the assumed lens element pitch (that is, less than the width of a lens element).

Figure 3:
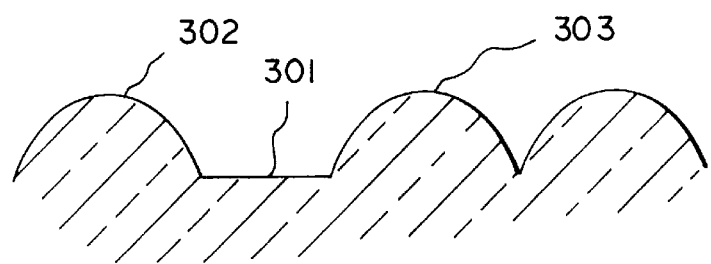
FIG. 3 is a transverse cross section through one type of lenticular lens sheet which may be used in the method of the present invention.

Thus, to determine the assumed lenticule positions, additional steps must be taken to assess the relationship between the lenticules and the two views. There are alternative approaches to these steps. For example, the lenticular material may be accurately cut during the extrusion process so that the same lenticule falls accurately along the edge of the material thereby forming a reference edge. This reference edge is then placed against stops or is independently viewed by television cameras to ensure that it is positioned both in orientation and location at a pre-defined point. FIG. 3 shows one way of ensuring that during the extrusion process a knife used to cut the lenticular material falls in the same location. A missing lenticule in the form of a groove 301 is formed by the extrusion dye or chill roll between two particular lenticules 302 and 303. A knife is then placed in the groove 301 to accurately slice the material in the manner parallel to the lenticules It will be appreciated that if chill roll extrusion processes are used it will be desirable for the chill roll to be machined so that the lenticular pattern is concentric with the surface of the roll. Alternatively a servo system can be used to track a portion of the lenticule or reference element or other lens sheet feature such that the knife is caused to follow the edge or some specific portion of a lenticule. Alternatively, the missing lenticule to guide the knife may not be used, instead a knife will be accurately and rigidly paced so that it cuts the edge along a cleft for example cleft 206 of a lenticule. An assumed lenticule position for an Nth lenticule can then be calculated based on the positioning of lens sheet 101 with its accurately cut edge (such as end edge 103c) abutting accurately aligned stops, and from the average lenticular pitch (normally provided by the lens sheet manufacturer, or which can be measured).

Another method to ensure that the lenticules seen by cameras 104 and 105 have a known relationship between each of them is to form a missing lenticule or other artifact in the lenticule material of such a shape that it can be seen by both cameras 104 and 105, thereby providing the cameras with a means for establishing relationships between lenticules including the angular orientation as well as location of sheet 101 in the drum 102. Yet another method to assess the alignment of the sheet 101 and drum 102 is to rotate a laser beam, which is imaged by a mirror 109, on a shaft 110 within drum 102 as it scans around inside the drum. This is done by sensing (using sensors, not shown) the light scattered back from laser beam 111 to determine when the laser beam crosses a lenticule cleft 206 due to the profile of the back scattered light. It is therefore possible to determine from the intensity profile and wave front profile of the back scattered light when the lenticule material is being traversed by the beam in such a way that the lenticules are not circumferentially aligned with the path of the laser beam on a the inside of the drum.

It will be appreciated that the goal of this alignment process is to ensure that as the laser beam rotates inside the drum it is at all times tracing out a path which corresponds to being parallel to the lenticule and maintains its position throughout the whole circumference on the same point on the image falling surface with respect to a specific lenticule. This is illustrated in FIG. 4 where a cross section of the lenticular lens sheet 101 is shown in perspective. One way to ensure that the image formed maintains alignment with respect to the lenticules is to ensure that the laser beam traces a path, for example path 403, which has a constant distance 404 from the edge or cleft of lenticule 203. However, if this distance is not constant this indicates a shift of a lenticule from its assumed position to an actual position and the laser beam trace as measured by the back scattered light can be used as a measure of an assumed or expected lenticule relative position.

For a given lenticule then, since its actual position is sensed by a camera and the assumed position is now known (from one of the foregoing techniques), the difference in those two values represents a deviation in lenticule position from the assumed position. This will be true for any of multiple locations along a given lenticule at which the lenticule position is sensed by a camera. Thus, even deviations in lenticule straightness or direction of a given lens element (such as a non-linear shape or curvature) can be calculated provided a sufficient number of relative position sensings were performed along the length of the lenticule. Preferably at least two such sensings should be taken, but to follow deviations in lens element straightness or curvature the greater the number of measurements, the more accurately such deviations can be followed. Note that using the foregoing methods, deviations greater than the width of one lenticule could not be detected. For the most part this is sufficient since such deviations in modern lenticular lens sheets tend to be less than the width of a lenticule. However, one could determine greater deviations if, for example, the locations of all lenticules between a reference edge or laser line and a lenticule of interest, were also directly sensed by one of the cameras. This can be done by providing a full field of view by using a transparent drum and analyzing the image pattern.

Because it is preferable that the beam align with the desired position of a lenticle it may be necessary to sense the position of the beam using cameras 104, 105 to ensure that the deflection system driving the beam is in fact positioning the beam at the anticipated location. Due to the intensity of the beam the cameras 104, 105 can sense the beam through the coated lenticular material. Alternatively, additional cameras or sensors may be used to confirm and or compensate for the beam position. Any necessary computations can be done by suitably programmed processor of processor and memory unit 504.

A particular method of compensating for any variations in actual sensed positions of lenticules 203 from expected positions, is to first generate from the scanning process described above, a map corresponding to the determined lenticule position deviations between end 103c and opposite end of the lens sheet and which also includes the lenticule profiles (that is, their sensed shape along their lengths). This deviation map may include the expected locations of the lenticules based on where a scan line crosses from one lenticule to the other, or based on the alignment of an edge of the lenticular lens sheet as previously described combined with the knowledge of average lenticule pitch. The lenticular image stored in memory is then modified with the deviation map, such as by directly modifying the lenticular image in a processor or modifying the lenticular image at the image writer by varying the position of mirror 109, in a manner already described above. In the first case the laser beam path, although misaligned with respect to the lenticular material, sweeps out an image which is an alignment with the lenticular material. For example, the lenticular image includes width or spacing of interleaved lines based on an assumed pitch of the lenticules. Either (or both) of these could be altered in accordance with the sensed positions of the reference elements. In the second case, the laser beam path alignment is corrected before writing of a portion of the lenticular image so that it lines up with the distorted lenticules.

In summary then various methods have been described for assessing the alignment of the lenticular material within the drum and once the alignment has been determined it is possible to either electronically correct for this misalignment by using the tracking technique described above or by ensuring that the laser beam in fact tracks along the lenticules as shown in FIG. 4. Alternatively, to ensure that the laser beam tracks along the lenticular material it is possible to either realign the lenticular material within the drum or to modify the laser path in such a way that the path tracks along the lenticules. Realignment involves using servo motor systems (not shown) to change the orientation of the lens sheet 101 in drum 102 based on the lens element map as described above.

It will be appreciated that the techniques described above focus primarily on the orientation and position of the lens sheet 101 in drum 102. However, as previously mentioned, it may occur that the lens sheet 101 even when properly aligned within drum 102 still does not allow accurate positioning the scanning beam along every lenticule. This may occur because of either non straight lenticules, scanning which is not perfectly straight, pincushion or barrel distortion the scan or sheet 101, or other forms of non-straight distortion between the scan and sheet 101.

As previously described, these artifacts can be corrected for using higher order correction methods. In the case where cameras are used to determine deviation of location of the lenticular material additional cameras such as camera 114 can be located around the drum to assess if there is bend in the lenticular material. Alternatively cameras 104, 114, and 105 can move along drum 102, which can be transparent (for example, moving in synchronization with the motion of mirror 109 along the axis of drum 102). Data regarding lenticular position from these cameras can be used in the creating the lens map which can then be used to modify the lenticular image map, as described above.

Figure 5:
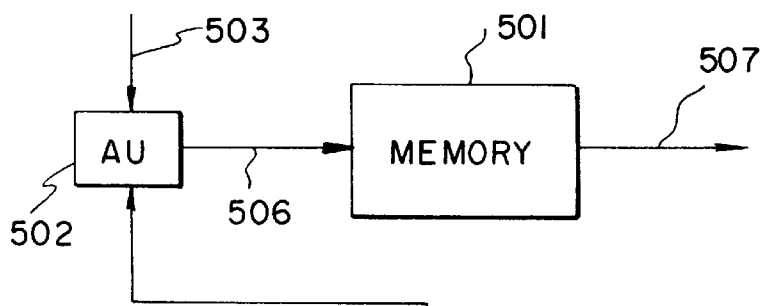
FIG. 5 is a block diagram of processing and other components used in conjunction with the components shown in FIG. 1.
Figure 5:
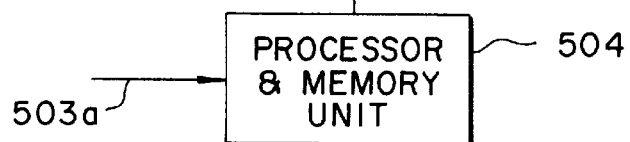

One of the ways of modifying the lenticular image with the lens elmeent map is illustrated diagramatically in FIG. 5. An image memory 501 contains the lenticular image information to be used to modulate beam 111 as it sweeps around inside drum 102 and as shaft 110 gradually moves the beam along inside the drum in a helical fashion. Encoders (not shown) provide the coordinate position data of shaft 115 on which mirror 109 is mounted in both angular orientation and axial location within drum 102, and this data enters processor 502 along data lines 503. Data lines 503a also are sent from the cameras to a lens map processor and memory unit 504 in which the lens map based on the sensed locations of the lenticular lenses is generated and stored. Processor 502 determines, at each point along the scan as communicated by positional data on lines 503, a deviation of the actual sensed corresponding lenticule position from the expected lens position. This deviation data is then fed from processor 502 in the form of correction data on line 506 to correct the co-ordinates in memory of the lenticular image data that corresponds to the expected lenticule position. This corrected data is then output on lines 507 to correctly modulate the intensity of the beam at a position corresponding to its actual location. Thus beam 111 writes the correct image data on material image medium 401 which corresponds to the actual position of the lenticule. It will be seen then, that this type of modifying of the lenticular image can correct for errors in lenticular pitch as well as lenticular shape. Further, even if the positions of less than all the lenticules of lens sheet 101 are actually sensed, processor 502 is capable of estimating an estimate of the actual position of such non-sensed lenticules from sensed lenticule positions such as by interpolation and/or extrapolation. These estimated positions effectively become part of the lens element map (which are either stored in unit 504 or become part of the map as the deviation calculations are made by processor 502). Similarly, the position of the lenticule at additional locations along its length, can also be determined by estimation from sensed positions at other locations.

Another method for correcting second order distortion effects of the image sheet 101 is to use servo systems to provide stress on the lens sheet 101 so it is distorted in such a way as to correct for the curvature and other distortion effects. Again the stress applied is determined by the lens map before actual printing and so by the time printing has occurred, can be regarded as a convolution of the lens map with the lenticular image.

It will be appreciated that many of the techniques described here, including a multiple camera technique for determining location orientation and distortion, can also be used when contact printing lenticular material. In this case either the negative material or the lenticular material can be distorted using servo systems which introduce stress into either the lenticular material or the negative. Multiple cameras can also be used to correct for magnification errors and in this case, as described in Morton patent U.S. Pat. No. 5,492,578 flexing or distortion techniques using servo motors can also be used to introduce stress to either the lenticular material and/or the negative to bring them into correct alignment.

It will be appreciated that in the present invention, each of the steps of the methods described can be executed from suitable computer program code instructions embodied on a computer readable medium, when that medium is read by a suitable computer. Such a computer could, for example, include the components illustrated in FIG. 5. The referenced computer readable storage medium may comprise, for example: magnetic storage media such as magnetic disc (such as a floppy disc) or magnetic tape; optical storage media such as optical disc, optical tape, or machine readable bar code; solid state electronic storage devices such as random access memory (RAM), or read only memory (ROM); or any other physical device or medium employed to store a computer program.

The formation of suitable lenticular composite images by interlacing lines from different scenes, and their exposing or writing to the back side of integral imaging elements, is described for example, in U.S. Pat. No. 5,278,608, U.S. Pat. No. 5,276,478 and U.S. Pat. No. 5,455,689. The integral image can, for example, be made of two or more images of a scene taken at different perspectives (that is, at different angular positions with respect to the scene). Such an integral image, when recorded on the light sensitive layer and viewed from a position forward of the front side of the lenticular lens sheet, may provide one or more three-dimensional images. By a "three-dimensional image", is meant an integral image which, when viewed through the front side of the lens sheet (that is viewed through the lens elements), has a visible depth element as a result of the various views being relational configured to appear as the views that would be seen from different positions when actually viewing a three-dimensional object. A depth element means the ability to at least partially look around an object in the scene. This can be obtained by interlacing lines from different perspective views of the same scene, in a known manner. Thus, a three-dimensional image necessarily includes at least two views of a scene. Alternatively or additionally, the integral image may contain one or more two-dimensional images which may be recorded in alignment with the lens sheet so as to be viewable when the lenticules are angularly positioned horizontally or vertically with respect to the user's eyes. Such two-dimensional images can include images forming a motion scene when the angle of the lenticules are changed with respect to a user's eyes, or simply completely different images or images which morph into one another, as previously described above.

The invention has been described in detail with particular reference to certain preferred embodiments thereof, but it will be understood that variations and modifications can be effected within the spirit and scope of the invention.

| PARTS LIST | |
|---|---|
| 101 | Sheet |
| 102 | Drum |
| 102a | Opening |
| 103 | Back side |
| 103a, 103b | Ends |
| 103c | Edge |
| 104, 105, 114 | Cameras |
| 106, 107 | Windows |
| 108 | Port |
| 109 | Mirror |
| 110 | Shaft |
| 111 | Beam |
| 115 | Shaft |
| 201 | Band |
| 202 | Region |
| 203 | Lenticule |
| 206 | Clefts |
| 207 | Line |
| 301 | Groove |
| 302, 303 | Lenticules |
| 401 | Image Forming Medium |
| 403 | Path |
| 404 | Constant Distance |
| 501 | Memory |
| 502 | Processor |
| 503, 503a | Data Lines |
| 504 | Processor and Memory Unit |
| 506, 507 | Lines |

I claim:
1. A method for forming an integral image on an image receiving medium which image is aligned or alignable with an integral lens sheet having a back side and a plurality of separate lens elements on a front side, the method comprising:
   directly sensing the location of each of a plurality of reference elements on the lens sheet which reference elements are separated in a same direction the lens elements are separated and span a plurality of lens elements; and
   writing portions of the lenticular image on the image receiving medium each portion of which is associated with a corresponding lens element, in accordance with the sensed positions of the reference elements;
   wherein each of a plurality of image portions is written at a position which is a function of the directly sensed location of at least one selected reference element, the functions for at least some of the plurality of image portions being based on at least one different reference element.

2. A method according to claim 1 wherein the reference elements are lens elements.

3. A method according to claim 1 wherein the step of directly sensing comprises sensing the location by illuminating at least a portion of each of the plurality of lens elements and simultaneously observing the modulation of the illumination by each of the plurality of lens elements.

4. A method according to claim 1 wherein the image receiving medium is located on the back side of the integral lens sheet so that each integral image portion is written in alignment with the corresponding lens element.

5. A method according to claim 4 wherein:
   the receiving medium includes a photosensitive layer; and
   the lens sheet is held in a fixed cylindrical shape with the image receiving medium facing inward during the directly sensing and writing steps and the lens elements facing outward, and wherein the image portions are written onto the image receiving medium by directing a light beam from along the axis of the cylindrical shape to the photosensitive layer.

6. A method according to claim 5 wherein the integral lens sheet initially has a planar shape, the method additionally comprising:
forming the lenticular lens into the cylindrical shape; and
reforming the lenticular lens sheet into a planar shape following writing of the integral image.

7. A method according to claim 1 wherein the image receiving medium is a substrate separate from the integral lens sheet, the method additionally comprising positioning the printed integral image on the back side of the integral lens sheet and aligning the integral image with the lens elements.

8. A method for forming a lenticular image in alignment with a lenticular lens sheet having an image receiving medium and a plurality of lenticules, comprising:
directly sensing the location of each of a plurality of reference elements on the lens sheet which are spaced apart in a direction transverse to the lenticules and span a plurality of lens elements;
writing portions of the lenticular image on the image receiving medium on the lens sheet, each portion of which is associated with a corresponding lenticule, in accordance with the sensed positions of the reference elements.

9. A method according to claim 8 wherein each of a plurality of lenticular image portions is written at a position which is a function of the directly sensed location of at least one selected reference element, the functions for at least some of the plurality of image portions being based on at least one different reference element.

10. A method according to claim 8 wherein the reference elements are lenticules.

11. A method according to claim 8 wherein the directly sensing and writing steps are repeated for further reference elements and lenticular image portions until the complete lenticular image is written.

12. A method according to claim 10 wherein the step of directly sensing includes directly sensing the position of each of the plurality of lenticules at a plurality of lengthwise spaced positions along the length of each.

13. A method according to claim 12 wherein the plurality of lengthwise spaced positions include at least one lengthwise position between a first and a second lengthwise spaced positions.

14. A method according to claim 8 wherein the plurality of reference elements includes multiple reference elements between a first reference element closest to a first edge of the lens sheet and a last reference element closest to a second edge of the sheet which is opposite the first edge.

15. A method according to claim 8 wherein the lenticular image includes width or spacing of interleaved lines based on an assumed pitch of the lenticular lens elements, and wherein the width or spacing is altered in accordance with the sensed positions of the reference elements.

16. A method according to claim 8 wherein the portions of the integral image corresponding to different lenticules are written by moving the lens sheet and a writer in relation to one another in a transverse direction corresponding to a direction transverse to the lenticular lenses.

17. A method according to claim 10 wherein the step of directly sensing comprises directly sensing the positions of all the lens elements required to accommodate the integral image.

18. A method for forming a lenticular image in alignment with a lenticular lens sheet having an image receiving medium and a plurality of lenticules, comprising:
directly sensing the location of at least three reference elements spaced in a direction along the lenticules;
writing portions of the lenticular image on the image receiving medium on the lens sheet, each portion of which is associated with a corresponding lenticule, in accordance with the sensed positions of the reference elements.

19. A method for forming a lenticular image in alignment with a lenticular lens sheet having an image receiving medium and a plurality of lenticules, comprising:
directly sensing the location of each of a plurality of reference elements on the lens sheet which are spaced apart in a direction transverse to the lenticules and which span a plurality of lens elements;
forming a lens element map from the directly sensed locations as a signal;
writing portions of the lenticular image on the image receiving medium on the lens sheet, each portion of which is associated with a corresponding lenticule, in accordance with the sensed positions of the reference elements;
wherein prior to writing the lenticular image the lenticular image is modified with the lens element map so that the image portions are aligned with the lens elements.

20. A method according to claim 19 wherein the reference elements are lenticules.

21. A method according to claim 19 wherein the lenticular image is modified with the lens element map in a processor.

22. A method according to claim 19 wherein the lenticular image is modified with the lens element map by varying at a writer for writing the lenticular image, the locations of respective portions of the lenticular image in accordance with the lens element map.

23. A method according to claim 19 wherein the receiving medium includes a photosensitive layer and the portions of the lenticular image are written by directing a light beam onto the photosensitive layer.

24. A method according to claim 23 wherein the lenticular image is modified by the lens element map by moving at least one of the light beam and lens sheet in relation to one another.

25. A method according to claim 20 wherein less than all of the lens elements have their positions directly sensed, and wherein the step of forming the lens element map includes estimating the positions of lens elements between directly sensed lens elements.

26. A method according to claim 20 wherein:
the step of directly sensing includes directly sensing the position of each of the plurality of lenticules at a plurality of lengthwise spaced positions along the length of each; and
the step of forming the lens element map includes, for at least one of the plurality lenticules which had its position directly sensed at a plurality of lengthwise spaced positions, estimating the position at additional locations along the length of the at least one lenticule.

27. An apparatus for writing an integral image which is aligned or alignable with an integral image lens sheet having a back side and a plurality of lens elements on a front side, comprising:
sensor means for directly sensing the location of each of a plurality of reference elements on the lens sheet which reference elements are separated in a same direction the lens elements are separated and span a plurality of lens elements;

an image writer which can write portions of the integral image on an image receiving medium in accordance with the sensed positions of the reference elements; and a processor which causes the image writer to write each of a plurality of image portions at a position which is a function of the directly sensed location of at least one selected reference element, the functions for at least some of the plurality of image portions being based on at least one different reference element.

28. An apparatus according to claim 27 wherein the sensor means comprises illumination sources to independently illuminate at least a portion of each of the plurality of reference elements and detectors to observe the modulation of the illumination sources by the reference elements.

29. Apparatus for forming a lenticular image in alignment with a lenticular lens sheet having an image receiving medium and a plurality of lenticules, comprising:

sensor means for directly sensing the location of each of a plurality of reference elements on the lens sheet which are spaced apart in a direction transverse to the lenticules and span a plurality of lens elements;

an image writer to write portions of the lenticular image on the image receiving medium on the lens sheet, each portion of which is associated with a corresponding lenticule, in accordance with the sensed positions of the reference elements.

30. Apparatus according to claim 29 wherein the sensor means includes means for directly sensing the position of each of the plurality of lenticules at a plurality of lengthwise spaced positions along the length of each.

31. Apparatus according to claim 29 additionally comprising a memory to hold the lenticular image as a signal which includes width or spacing of interleaved lines based on an assume pitch of the lenticular lens elements, the apparatus additionally comprising a processor which alters the width or spacing in accordance with the sensed positions of the reference elements.

32. An apparatus according to claim 29 additionally comprising a retainer to hold the lens sheet in a cylindrical shape with an image receiving medium in the form of a photosensitive layer, facing inward; and wherein the image writer includes a light beam source movable lengthwise along the cylindrical axis to write each image portion by rotation of the light beam source about the axis.

33. An apparatus for forming a lenticular image in alignment with a lenticular lens sheet having an image receiving medium and a plurality of lenticules, comprising:

a sensor means for directly sensing the location of each of a plurality of reference elements on the lens sheet which are spaced apart in a direction transverse to the lenticules and span a plurality of lens elements;

a processor for forming a lens element map from the directly sensed locations as a signal;

an image writer to write portions of the lenticular image on the image receiving medium on the lens sheet, each portion of which is associated with a corresponding lenticule, in accordance with the sensed positions of the reference elements;

wherein the processor modifies the lenticular image with the lens element map prior to the image writer writing the lenticular image, so that the image portions are aligned with the lens element, wherein each of a plurality of image portions is written at a position which is a function of the directly sensed location of at least one selected reference element, the functions for at least some of the plurality of image portions being based on at least one different reference element.

* * * * *